(12) United States Patent
Ka et al.

(10) Patent No.: US 12,379,766 B2
(45) Date of Patent: Aug. 5, 2025

(54) SWITCHING METHOD BETWEEN RUNNING MODES OF APPLICATION PROGRAM, APPARATUS, ELECTRONIC DEVICE AND STORAGE MEDIUM

(71) Applicant: BEIJING ZITIAO NETWORK TECHNOLOGY CO., LTD., Beijing (CN)

(72) Inventors: Tao Ka, Beijing (CN); Dongyang Zhao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/610,653

(22) PCT Filed: Sep. 8, 2021

(86) PCT No.: PCT/CN2021/117201
§ 371 (c)(1),
(2) Date: Nov. 11, 2021

(87) PCT Pub. No.: WO2022/057704
PCT Pub. Date: Mar. 24, 2022

(65) Prior Publication Data
US 2023/0251703 A1 Aug. 10, 2023

(30) Foreign Application Priority Data
Sep. 15, 2020 (CN) .......................... 202010967194.8

(51) Int. Cl.
*G06F 1/329* (2019.01)

(52) U.S. Cl.
CPC .................................. *G06F 1/329* (2013.01)

(58) Field of Classification Search
None
See application file for complete search history.

(56) References Cited

U.S. PATENT DOCUMENTS

| 6,289,399 B1 | 9/2001 | Furuichi et al. |
| 7,640,041 B2 * | 12/2009 | Ragan ............... H04M 1/72448 360/137 |

(Continued)

FOREIGN PATENT DOCUMENTS

| CN | 103631356 A | 3/2014 |
| CN | 104105227 A | 10/2014 |

(Continued)

OTHER PUBLICATIONS

International Patent Application No. PCT/CN2021/117201, International Search Report mailed Nov. 26, 2021, 10 pages.

(Continued)

*Primary Examiner* — Paul Yen

(57) ABSTRACT

The embodiments of the present disclosure relate to a switching method and switching apparatus between running modes of an application program, an electronic device and a storage medium, wherein the switching method includes: acquiring application power-saving information preset by a user; acquiring remaining power of a terminal for installing the application program in a running process of the application program; and determining whether to switch from a current running mode of the application program to an application power-saving mode according to the application power-saving information and the remaining power of the terminal.

19 Claims, 6 Drawing Sheets

(56) References Cited

U.S. PATENT DOCUMENTS

| | | | |
|---|---|---|---|
| 8,937,678 | B2 | 1/2015 | Fuji |
| 9,160,853 | B1 | 10/2015 | Daddi et al. |
| 10,261,564 | B1 | 4/2019 | Gollakota |
| 10,346,597 | B2* | 7/2019 | Yang ............... G06F 21/31 |
| 10,503,280 | B2 | 12/2019 | Yoo et al. |
| 2008/0200220 | A1 | 8/2008 | Jackson |
| 2012/0159327 | A1 | 6/2012 | Law et al. |
| 2014/0256323 | A1* | 9/2014 | Edge ............... H04W 64/00 455/436 |
| 2014/0267360 | A1 | 9/2014 | Finkel |
| 2014/0365789 | A1 | 12/2014 | Seo et al. |
| 2015/0113425 | A1* | 4/2015 | Noh ............... G06F 3/038 715/740 |
| 2015/0153810 | A1 | 6/2015 | Sasidharan et al. |
| 2016/0247437 | A1* | 8/2016 | Choi ............... G09G 3/2003 |
| 2016/0358631 | A1* | 12/2016 | Lee ............... G11B 27/105 |
| 2017/0060225 | A1* | 3/2017 | Zha ............... G06F 1/3234 |
| 2017/0313240 | A1* | 11/2017 | Randolph ............... B60T 7/02 |
| 2017/0371390 | A1 | 12/2017 | Wang et al. |
| 2017/0371394 | A1 | 12/2017 | Chan et al. |
| 2018/0268117 | A1 | 9/2018 | Yang et al. |
| 2018/0316212 | A1 | 11/2018 | Qin et al. |
| 2019/0369700 | A1 | 12/2019 | Chen et al. |
| 2020/0036203 | A1* | 1/2020 | Ruiz-Garcia ............... H02J 9/005 |

FOREIGN PATENT DOCUMENTS

| | | |
|---|---|---|
| CN | 104166453 A | 11/2014 |
| CN | 104460935 A | 3/2015 |
| CN | 106161733 A | 11/2016 |
| CN | 106161773 A | 11/2016 |
| CN | 106648876 A | 5/2017 |
| CN | 107346167 A | 11/2017 |
| CN | 107548142 A | 1/2018 |
| CN | 108803853 A | 11/2018 |
| CN | 108804208 A | 11/2018 |
| CN | 109803358 A | 5/2019 |
| CN | 112083787 A | 12/2020 |
| EP | 3058782 A1 | 8/2016 |
| EP | 3058782 B1 | 3/2020 |
| JP | H1173255 A | 3/1999 |
| JP | 2013115670 A | 6/2013 |
| JP | 2015070394 A | 4/2015 |
| JP | 2016530614 A | 9/2016 |
| JP | 2017501617 A | 1/2017 |
| KR | 20160102730 A | 8/2016 |
| WO | 2015008971 A1 | 1/2015 |
| WO | 2015062504 A1 | 5/2015 |
| WO | 2017/190438 A1 | 11/2017 |
| WO | 2019047924 A1 | 3/2019 |

OTHER PUBLICATIONS

Chinese Patent Application No. 202010967194.8, First Office Action mailed Apr. 28, 2021, 15 pages with English Translation.

Notice of Reasons for Refusal issued Sep. 12, 2023 in Japanese Application No. 2022-549585, with English translation (8 pages).

European Search Report for EP Patent Application No. 21868529.5, Issued on Feb. 28, 2024, 14 pages.

European Search Report for EP Patent Application No. 21868529.5, Issued on Jun. 12, 2024, 16 pages.

Office action received from Korean patent application No. 10-2022-7028557 mailed on Jun. 19, 2024, 27 pages (15 pages English Translation and 12 pages Original Copy).

Communication pursuant to Article 94(3) EPC for European Application No. 21868529.5, mailed Mar. 7, 2025, 5 pages.

Notice of Final Rejection for Korean Application No. 10-2022-7028557, mailed Feb. 25, 2025, 18 Pages.

* cited by examiner

SWITCHING METHOD BETWEEN RUNNING MODES OF APPLICATION PROGRAM, APPARATUS, ELECTRONIC DEVICE AND STORAGE MEDIUM

CROSS-REFERENCE TO RELATED APPLICATIONS

This application is a National Stage of International Application No. PCT/CN2021/117201, filed on Sep. 8, 2021, which is based on and claims the priority to the Chinese patent application No. 202010967194.8 filed on Sep. 15, 2020. The disclosures of the aforementioned applications are hereby incorporated by reference in their entireties into the present application.

TECHNICAL FIELD

This disclosure relates to the technical field of computer application, and particularly, to a switching method and switching apparatus between running modes of an application program, an electronic device, and a storage medium.

BACKGROUND

As more and more applications can be installed on a user terminal, functions supported by the user terminal are more and more diversified, and power consumption of the user terminal is also increased.

In the related art, usually starting from an operating system of the user terminal, the user terminal is caused to enter a power-saving mode by reducing data processing processes of the operating system, so as to reduce the power consumption of the user terminal. However, after the user terminal enters the power-saving mode, normal running of each application program installed on the user terminal is easily affected.

SUMMARY

In order to solve or at least partially solve the above technical problem, embodiments of the present disclosure provide a switching method and switching apparatus between running modes of an application program, an electronic device, and a storage medium.

In a first aspect, the embodiments of the present disclosure provide a switching method between running modes of an application program, comprising:
  acquiring application power-saving information preset by a user;
  acquiring remaining power of a terminal for installing the application program in a running process of the application program; and
  determining whether to switch from a current running mode of the application program to an application power-saving mode according to the application power-saving information and the remaining power of the terminal.

In a second aspect, the embodiments of the present disclosure further provide a switching apparatus between running modes of an application program, comprising:
  an information acquisition module, configured to acquire application power-saving information preset by a user;
  an power acquisition module, configured to acquire remaining power of a terminal for installing the application program in a running process of the application program; and
  a mode switching module, configured to determine whether to switch a current running mode of the application program to an application power-saving mode according to the application power-saving information and the remaining power of the terminal.

In a third aspect, the embodiments of the present disclosure further provide an electronic device, comprising: a processor; and a memory configured to store executable instructions of the processor; wherein the processor is configured to read the executable instructions from the memory and execute the executable instructions to implement any of the switching methods between running modes of the application program according to the embodiments of the present disclosure.

In a fourth aspect, the embodiments of the present disclosure further provide a computer-readable storage medium having therein stored a computer program which, when executed by a processor, implements any of the switching methods of the application program running mode according to the embodiments of the present disclosure.

In a fifth aspect, the present disclosure provides a computer program, comprising: instructions which, when executed by a processor, cause the processor to perform any of the switching methods between running modes of the application program according to the embodiments of the present disclosure.

In a sixth aspect, the present disclosure provides a computer program product, comprising instructions which, when executed by a processor, cause the processor to perform any of the switching methods between running modes of the application program according to the embodiments of the present disclosure.

Compared to the related art, technical solutions according to the embodiments of the present disclosure have the following advantages: in the technical solutions of the embodiments of the present disclosure, by determining whether the application program currently running on the terminal needs to enter the application power-saving mode according to the application power-saving information preset by the user and the remaining power of the terminal, a reasonable solution of reducing power consumption of the terminal is provided from the perspective of the application program, and the application program itself supports the setting of the power-saving mode, so that the effect of reducing the power consumption of the terminal by individually controlling the specific application program to enter the application power-saving mode is achieved; and the specific application program entering the application power-saving mode will not affect normal running of other application programs on the terminal, that is, the other application programs do not need to enter the power-saving mode at the same time, so that the problem of lack of the reasonable solution of effectively reducing the power consumption of the terminal in the related art is solved.

BRIEF DESCRIPTION OF THE DRAWINGS

The accompanying drawings herein, which are incorporated into and constitute a part of this specification, illustrate embodiments consistent with the present disclosure and, together with the specification, serve to explain principles of the present disclosure.

In order to more clearly illustrate technical solutions in the embodiments of the present disclosure or the prior art, the drawings used in the description of the embodiments or technical solutions in the prior art will be briefly described below, and it is obvious for those of ordinary skill in the art

DETAILED DESCRIPTION

In order that the above objects, features and advantages of the present disclosure can be more clearly understood, the solutions of the present disclosure will be further described below. It should be noted that, in the case of no conflict, the embodiments of the present disclosure and features in the embodiments can be combined with each other.

In the following description, numerous specific details are set forth in order to provide a thorough understanding of the present disclosure, but the present disclosure can be implemented in other ways different from those described herein; and it is obvious that the embodiments disclosed in the specification are only some of the embodiments of the present disclosure, and not all of them.

Figure 1:
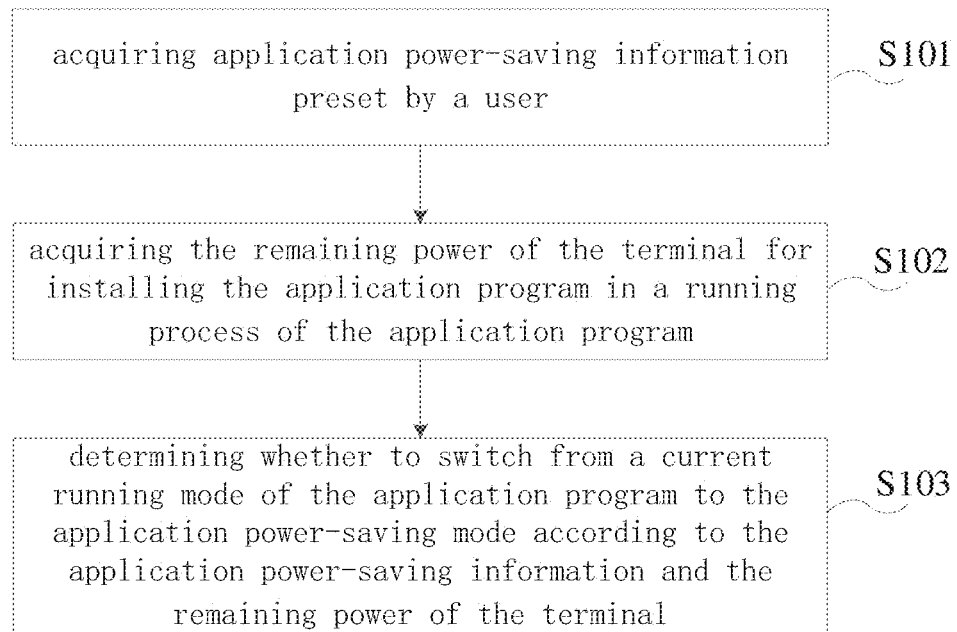
FIG. 1 is a flowchart of a switching method between running modes of an application program according to the embodiments of the present disclosure.

FIG. 1 is a flowchart of switching method between running modes of an application program according to the embodiments of the present disclosure. The embodiments of the present disclosure can be applied to the case of how an application program installed on a terminal is switched into a power-saving mode, so as to reduce power consumption of the terminal. The method according to the embodiments of the present disclosure can be performed by running mode switching apparatus between running modes an application program. The apparatus can be implemented by software and/or hardware, and can be integrated on any electronic device with computing capability, for example, a terminal such as a mobile terminal, a personal computer, a tablet computer, etc. In some embodiments, the apparatus can be implemented as a function of the application program, and integrated within the application program. Moreover, the application program mentioned in the embodiments of the present disclosure can be any type of application program, which is not specifically limited in the embodiments of the present disclosure.

As shown in FIG. 1, the switching method between running modes of the application program according to the embodiments of the present disclosure can comprise:

S101, acquiring application power-saving information preset by a user.

The application power-saving information preset by the user refers to relevant information about enabling an application power-saving mode of the application program, preset by the user, and can be used for describing information such as when the application program enters the application power-saving mode, the application program enters the power-saving mode when the terminal reaches how much remaining power, duration after the application program enters the application power-saving mode, etc. Accordingly, the application power-saving information preset by the user can include, but is not limited to: information such as a power-saving switching threshold of automatically enabling the application power-saving mode by the application program, time when the application program enters the application power-saving mode, and duration of the application power-saving mode. The power-saving switching threshold refers to remaining power of the terminal corresponding to a triggering time of switching the application program to the application power-saving mode.

If a power-saving mode setting control related to the application program is integrated in a setting page of an operating system of the terminal, the user can preset the application power-saving information of the application program through the setting page of the operating system of the terminal, and then the application program acquires the application power-saving information preset by the user through interaction with the operating system of the terminal. In some embodiments, the application program itself of the embodiments of the present disclosure can support a function of setting the application power-saving information by the user, that is, the application program itself can provide the setting page in which relevant controls of the power-saving mode setting are integrated to support a touch operation of the user. The application program can determine the application power-saving information preset by the user according to the touch operation of the user, and then acquires information without interaction with the operating system of the terminal, which on one hand, helps to enrich functions realized by the application program, and on the other hand, can improve efficiency of acquiring the application power-saving information preset by the user. In addition, the application program supports the user to individually set the application power-saving information of the application program, which can improve the pertinence of the setting of the user, and avoid mistaken setting of the application power-saving information among different application programs caused by a mistaken selection operation of the user in the setting page of the operating system of the terminal.

S102, acquiring the remaining power of the terminal for installing the application program in a running process of the application program.

The application program, in the running process, comprises foreground or background running, and can detect the remaining power of the terminal in real time by using a pre-developed power detection program. The power detection program can detect the remaining power of the terminal in real time by means of a detection device such as a coulometer.

It should be noted that, operations S101 and S102 are not strictly limited in their execution sequence, and can be executed in a serial or parallel manner, and a logical sequence shown in FIG. 1 should not be construed as limiting the embodiments of the present disclosure.

S103, determining whether to switch from a current running mode of the application program to the application power-saving mode according to the application power-saving information and the remaining power of the terminal.

If the application power-saving information preset by the user and the remaining power of the terminal meet an application program running mode switching condition, the application program determines to switch from the current running mode to the application power-saving mode; and if the application power-saving information preset by the user and the remaining power of the terminal do not meet the application program running mode switching condition, the application program determines not to execute the mode switching. The application program running mode switching condition can comprise: the current remaining power of the terminal being less than a power-saving switching threshold; or the current remaining power of the terminal being less than the power-saving switching threshold, and the current time reaching the time preset by the user for the application program to enter the application power-saving mode; or without requirements on the current remaining power of the terminal, the current time reaching the time preset by the user for the application program to enter the application power-saving mode. The application program running mode switching condition can be specifically determined according to contents included in the application power-saving information preset by the user. The power-saving switching threshold can also be flexibly set by the user as needed, which realizes full consideration of user requirements in the process of enabling the application power-saving mode of the application program, and ensures the use experience of the user for the application program while reducing the power consumption of the terminal.

In addition, by presetting the duration of the application power-saving mode by the user, for example, after the application program enters the application power-saving mode, it automatically exits if the duration reaches 30 minutes, which can realize the enabling and exiting of the periodic power-saving mode of the application program, achieves the effects of flexibly reducing the power consumption of the terminal and flexibly reducing consumption on the power of the terminal, and enriches the functions of the application program.

In the technical solutions of the embodiments of the present disclosure, by determining whether the application program currently running on the terminal needs to enter the application power-saving mode according to the application power-saving information preset by the user and the remaining power of the terminal, a reasonable solution for reducing the power consumption of the terminal is provided from the perspective of the application program, and the application program itself supports the setting of the power-saving mode, so that the effect of reducing the power consumption of the terminal by individually controlling the specific application program to enter the application power-saving mode is achieved. And the specific application program entering the application power-saving mode does not affect normal running of other application programs on the terminal, that is, the other application programs do not need to enter the power-saving mode at the same time, so that the problem of lack of the reasonable solution for effectively reducing the power consumption of the terminal in the related art is solved. And the embodiments of the present disclosure realize full consideration of the user requirements in the process of enabling the application power-saving mode of the application program, and ensures the use experience of the user for the application program while reducing the power consumption of the terminal.

On the basis of the above technical solution, taking an example that the user sets the application power-saving information through the setting page in the application program, before acquiring the application power-saving information preset by the user, the method according to the embodiments of the present disclosure further comprises:

displaying the setting page in the application program; and determining the application power-saving information preset by the user according to a setting operation of the user on the setting page; wherein the application power-saving information comprises a power-saving switching threshold, which refers to remaining power of the terminal corresponding to a triggering time of switching the application program to the application power-saving mode.

Figure 2:
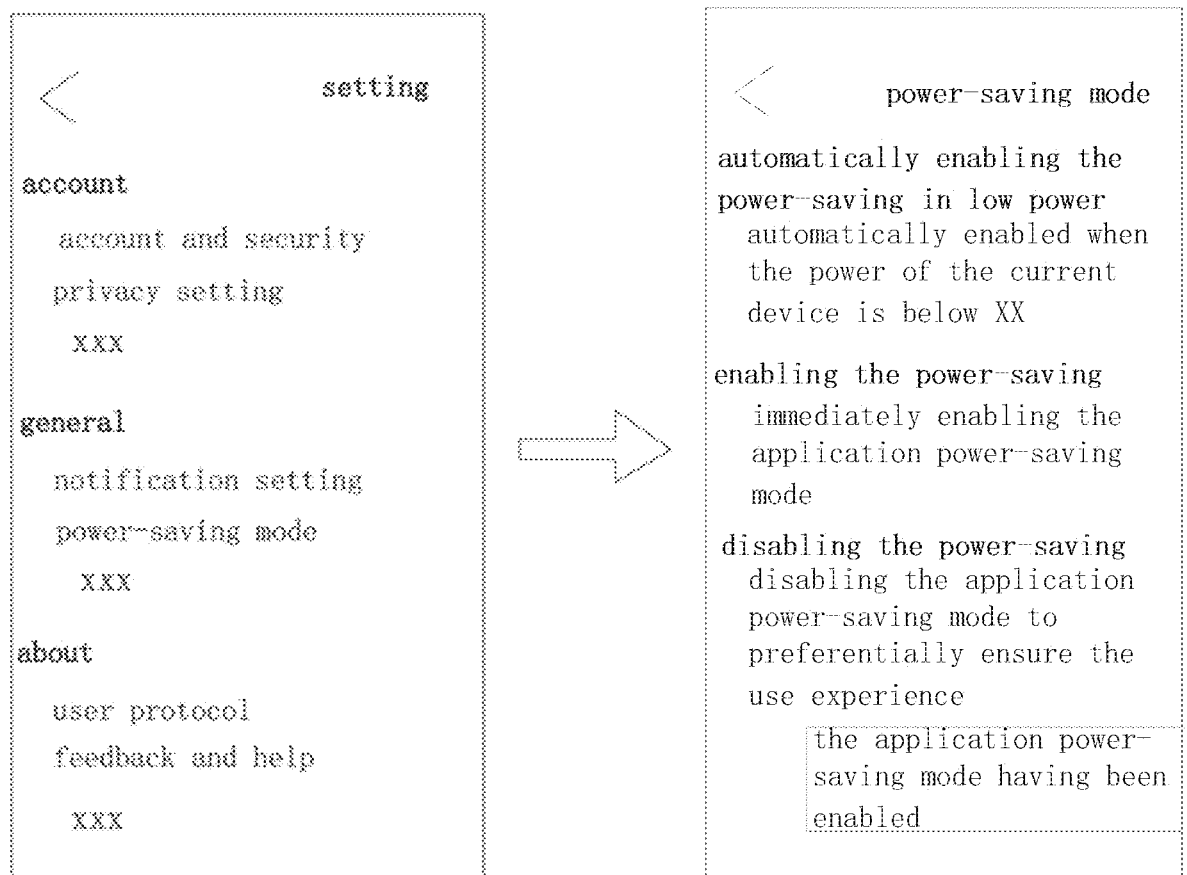
FIG. 2 is a schematic diagram of a setting page of an application program according to the embodiments of the present disclosure.

FIG. 2 is a schematic diagram of a setting page of an application program according to the embodiments of the present disclosure, which is an example and should not be construed as a specific limitation on the embodiments of the present disclosure. The application program can switch from an application main page into the setting page according to a touch operation of the user on a setting control on the application main page. As shown in FIG. 2, the setting page located on the left in the figure can include multiple types of setting sub-controls, such as an account setting sub-control, a general setting sub-control, an about sub-control, etc. Each type of setting sub-controls can further include a plurality of sub-controls of the type, for example, the account setting sub-control including sub-controls such as account and security, privacy setting, etc., the general setting sub-control including sub-controls such as notification setting, power-saving mode, etc., and the about sub-control including sub-controls such as user protocol, feedback and help, etc. The application program switches from the current setting page into a detailed setting page of the power-saving mode (i.e., a page located on the right in FIG. 2) according to a touch operation of the user on the power-saving mode sub-control on a left setting page. In the detailed setting page of the power-saving mode, the user can set the power-saving switching threshold through a sub-control of "automatically enabling the power-saving in low power", to determine a triggering condition that the application program enters the application power-saving mode. The power-saving switch threshold can be set to 30%, for example, that is, when detecting that the current remaining power of the terminal is 30% of the total power, the application program can automatically enter the application power-saving mode. A setting sub-control corresponding to the application power-saving mode entry time and a setting sub-control corresponding to the duration of the application power-saving mode (not shown in FIG. 2) can also be displayed in the detailed setting page of the power-saving mode.

In addition, in an installation process, or after the installation is completed, or after the user enables the application program for the first time, or before it is detected that the user sets the application power-saving information, after the user enables the application program every time, or in the running process of the application program, the application program can display the power-saving prompt information or directly and automatically display the setting page in the application program, for the user to set the application power-saving information, so that the effect of timely reminding the user of the power-saving setting is realized, and the interactivity between the application program and the user is improved.

Still as shown in FIG. 2, the detailed setting page of the power-saving mode located on the right in FIG. 2 further includes a sub-control of "enabling the power-saving" and a sub-control of "disabling the power-saving", which respectively support the user to manually enable or disable the application power-saving mode. In the application power-saving mode, a part of functions supported by the application program will be weakened or disabled, and the running performance of the application program is degraded, so that the use experience of the user for the application program in the application power-saving mode will be lessened compared to the non-application power-saving mode. Optionally, when the user manually enables the application power-saving mode of the application program by touching the sub-control of "enabling the power-saving", the detailed setting page of the power-saving mode can further display prompt information that the application power-saving mode has been enabled, for example, "the application power-saving mode having been enabled" shown in FIG. 2.

Exemplarily, the displaying the setting page in the application program comprises:

in the running process of the application program, if it is detected that the remaining power of the terminal is less than a prompt threshold, displaying the power-saving prompt information on a current display page of the application program; wherein the prompt threshold can be a remaining power value of the terminal preset in the application development process, or a remaining power value of the terminal preset by the user; and the power-saving prompt information can be displayed on an upper, middle, or lower part of the current display page, which is specifically related to the page layout, and is not limited in the embodiments of the present disclosure; and according to a touch operation of the user on the power-saving prompt information, switching from the current display page to the setting page in the application program, that is, the power-saving prompt information is used for prompting the user to set the application power-saving information and can be used as a switching approach of switching into the setting page.

Figure 3:
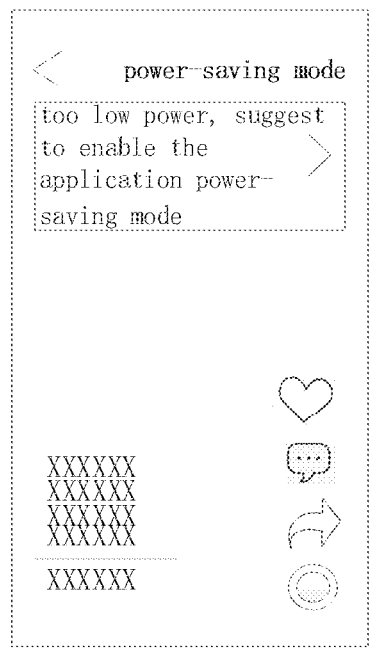
FIG. 3 is a schematic diagram of an application program running page having thereon displayed power-saving prompt information according to the embodiments of the present disclosure.

FIG. 3, as an example, illustrates a schematic diagram of an application program running page having thereon displayed power-saving prompt information according to the embodiments of the present disclosure. Specifically, taking a video interaction application as an example, FIG. 3 displays a running page in a foreground running process of the video interaction application, and when the application program detects that the remaining power of the terminal is less than the prompt threshold, the power-saving prompt information is displayed on the running page. In some embodiments, the power-saving prompt information can be displayed in a form of a prompt pop-up window, and by touching an entry control on the prompt pop-up window, i.e., an arrow symbol displayed in the figure, the user can cause the application program to display the page for setting the application power-saving information, i.e., switching from the page displayed in FIG. 3 into the page displayed in FIG. 2. Specifically, it can be first switched from the page displayed in FIG. 3 into the setting page located on the left in FIG. 2, and then into the detailed setting page of the power-saving mode located on the right in FIG. 2, and it can also be directly switched from the page displayed in FIG. 3 into the detailed setting page of the power-saving mode located on the right in FIG. 2, which is related to the page jump design logic, and is not specifically limited in the embodiments of the present disclosure.

Optionally, after the power-saving prompt information is displayed on the current display page of the application program, the method according to the embodiment of the present disclosure further comprises:

if a touch operation of the user on the power-saving prompt information is not detected within a preset time, removing the power-saving prompt information from the current display page.

The preset time can be flexibly set, for example, 5 seconds. If the touch operation of the user on the power-saving prompt information is not detected within the preset time, this shows that the user does not need to perform the power-saving setting of the application program currently, and the power-saving prompt information is removed, thereby avoiding the display of the power-saving prompt information from affecting the display effect of the current display page of the application program.

Figure 4:
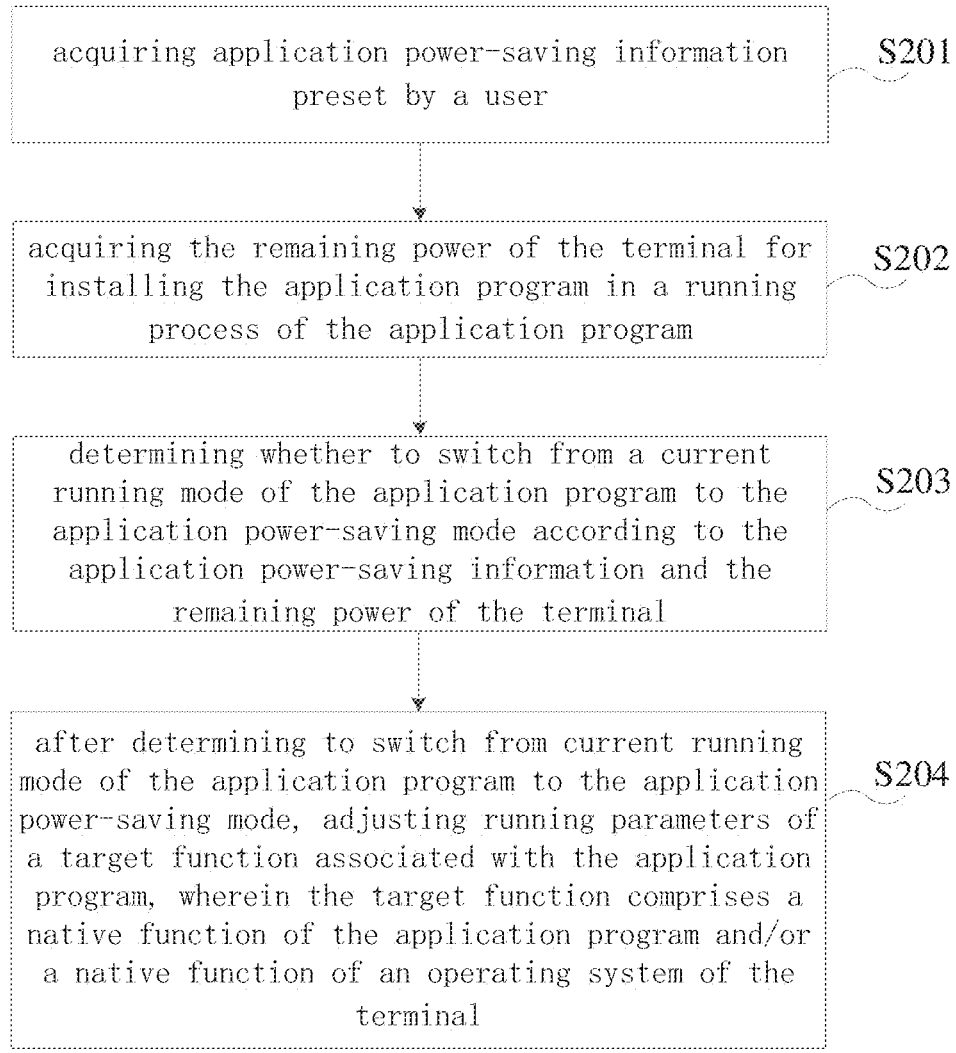
FIG. 4 is a flowchart of another switching method between running modes of an application program according to the embodiments of the present disclosure.

FIG. 4 is a flowchart of another switching method between running modes of an application program according to the embodiments of the present disclosure, which is further optimized and expanded based on the above technical solutions, and can be combined with each of the above optional embodiments. As shown in FIG. 4, the method can comprise:

S201, acquiring application power-saving information preset by a user;

S202, detecting remaining power of a terminal for installing the application program in a running process of the application program;

S203, determining whether to switch from a current running mode of the application program to an application power-saving mode according to the application power-saving information and the remaining power of the terminal; and S204, after determining to switch from the current running mode of the application program to the application power-saving mode, adjusting running parameters of a target function associated with the application program, wherein the target function comprises a native function of the application program and/or a native function of an operating system of the terminal.

That is, the application program will, after entering the application power-saving mode, adjust the running parameters of its associated target function. The running parameters that need to be adjusted are different for different target functions. Different running parameters of the target function have different consumption on the power of the terminal. The effect of reducing the power consumption of the terminal is achieved by adjusting the running parameters of the target function.

In the embodiments of the present disclosure, the native function of the application program refers to a function that can be implemented by the application program itself given by developers in a development process of the application program, and the implementation of these functions does not change due to different terminals for installing the application program; and the native function of the operating system of the terminal refers to a function carried by the terminal itself after leaving a factory, for example, a positioning function and a sensing detection function which depend on terminal hardware, and the application program installed on the terminal does not in itself have the native function of the operating system of the terminal, and if the application program needs to call the native function of the operating system of the terminal, it needs to interact with the operating system of the terminal, so that the calling of the function is realized.

Optionally, if the target function associated with the application program is the native function of the operating system of the terminal, the adjusting running parameters of a target function associated with the application program comprises: sending an adjustment instruction to the operating system of the terminal, wherein the adjustment instruction is used for instructing the operating system of the terminal to adjust running parameters of the native function of the operating system of the terminal.

In the embodiments of the present disclosure, after the application program enters the application power-saving mode, the native function of the application program and the native function of the operating system of the terminal both support the running parameter adjustment, which embodies the diversification of the function running parameter adjustment supported by the application program in the embodiments of the present disclosure, and ensures the effective implementation of reducing the power consumption of the terminal.

On the basis of the above technical solution, optionally, the application program in the embodiments of the present disclosure includes a video editing application program; accordingly, the native function of the application program includes at least one of: a network data transmission function, a data cleaning function, a multimedia data editing function, a multimedia data playing function or a page rendering function; or the native function of the operating system of the terminal includes at least one of: a positioning function or a detection function depending on a sensing device.

The network data transmission function includes, but is not limited to, data transmission between the application program and a server, for example, heartbeat data packet transmission (or referred to as long-chain service) between the application program and the server; the data cleaning function refers to a function that the application program cleans cached data, temporary data, downloaded data and the like generated in the program running process; the multimedia data editing function refers to a function of editing video, audio and image, which is supported by the application program; the multimedia data playing function refers to a function of playing multimedia data, which is supported by the application program; and the page rendering function refers to a function of rendering the display page by the application program. The sensing device installed on the terminal can include, but is not limited to, an infrared detection sensor, a light sensor, a distance sensor, a gyroscope, a gravity sensor, a temperature sensor, an electronic compass, a position sensor, etc., and can be specifically determined according to the sensing detection function supported by the terminal. A positioning type of the terminal includes a positioning function based on a Global Positioning System (GPS), a positioning function based on a BeiDou Navigation Satellite System, a wireless network positioning function, etc.

Optionally, the adjusting running parameters of a target function associated with the application program comprises: adjusting the running parameters of the target function according to an adjustment priority of the target function associated with the application program. The adjustment priority of the target function can be preset by the developers in the development process of the application program, or can be set by the user in the process of using the application program. In addition, the application program can further analyze use frequencies of the user for different target functions by collecting operation data in a process of using the application program by the user, so that adjustment priorities of the different target functions are determined according to the use frequencies, wherein the lower the use frequency of the user is, the higher the adjustment priority is.

Optionally, the adjusting the running parameters of the target function according to an adjustment priority of the target function associated with the application program comprises:

if the remaining power of the terminal is less than a first grade threshold, adjusting running parameters of a function belonging to the first adjustment grade in the target functions; wherein the function belonging to the first adjustment grade comprises at least one of: the multimedia data playing function, the positioning function, the page rendering function or the network data transmission function; if the remaining power of the terminal is less than a second grade threshold, adjusting running parameters of a function belonging to the second adjustment grade in the target functions; wherein the function belonging to the second adjustment grade comprises at least one of: the data cleaning function, the multimedia data editing function and the detection function depending on the sensing device; or the second grade threshold is less than the first grade threshold, and their values can be determined as needed, for example, the first grade threshold is set to 30%, and the second grade threshold is set to 10%.

Exemplarily, taking the video interaction application as an example, after determining to switch from the current running mode of the application program to the application power-saving mode, if the remaining power of the terminal is less than 30% but greater than 10%, brightness of playing the multimedia data by the application program, the calling of the terminal positioning function, the quantity of animation elements displayed on the page, and the number of times of transmission of the heartbeat data packets between the application program and the server are sequentially reduced; as the application program runs, if the remaining power of the terminal is less than 10%, the volume of the multimedia data played by the application program is continuously reduced, editing algorithms for adding special-effects and filters are disabled, and so on, but the video interaction application can still support video shooting and sharing.

After the application program enters the application power-saving mode, the running parameters of the target function are adjusted in stages, so that the application program can really reduce the power consumption of the terminal in the power-saving mode, which realizes the effect of saving the power of the terminal in a hierarchical manner and degrades the running performance of the application program in stages, and relieves the influence of the degraded application performance on the use experience of the user to a certain extent.

The following is an exemplary description of adjusting the running parameters of the target function associated with the application program in the embodiments of the present disclosure:

if the target function is a network data transmission function, the adjusting the running parameters of the target function associated with the application program, comprising at least one of:
adjusting a frequency of data interaction with the server to be less than an interaction threshold; wherein the lower the frequency of the data interaction between the application program and the server is, the less the consumption on the power of the terminal is; or adjusting a bit rate of multimedia data acquired from the server to be less than a bit rate threshold, wherein the lower the bit rate of the multimedia data acquired by the application program from the server is, the less the transmission quantity of the multimedia data is, and the less the consumption on the power of the terminal is;

and/or, if the target function is a data cleaning function, the adjusting the running parameters of the target function associated with the application program, comprising:

adjusting a frequency of application data cleaning to be less than a cleaning threshold; wherein the less the frequency of the application data cleaning is, the less the consumption on the power of the terminal is;

and/or, if the target function is a multimedia data editing function, the adjusting the running parameters of the target function associated with the application program, comprising:

disabling running a target editing algorithm, wherein the target editing algorithm comprises at least one of a filter adding algorithm, a prop adding algorithm or a special-effect adding algorithm; and on the basis of keeping basic multimedia data editing functions of the application program available, the disabling running a target editing algorithm can reduce the data processing quantity of a central processing unit and/or a graphic processing unit of the terminal, thereby effectively reducing the power consumption of the terminal;

and/or, if the target function is a multimedia data playing function, the adjusting the running parameters of the target function associated with the application program, comprising at least one of:

adjusting playing brightness of the multimedia data to be less than a brightness threshold; wherein the lower the playing brightness of the multimedia data is, the less the consumption on the power of the terminal is; or adjusting playing volume of the multimedia data to be less than a volume threshold, wherein the lower the playing volume of the multimedia data is, the less the consumption on the power of the terminal is;

and/or, if the target function is a page rendering function, the adjusting the running parameters of the target function associated with the application program, comprising at least one of:

adjusting the quantity of animation elements in a page rendering process to be less than a quantity threshold, wherein the less the quantity of the animation elements included in the page is, the less the consumption on the power of the terminal in the page display process is, for example, the quantity of some resident animation elements in the page can be reduced; or switching the animation elements in the page rendering process into static elements, wherein the display of the static elements in the page consumes less power of the terminal than the display of the dynamic elements, for example, some resident animation elements in the page can be switched to corresponding static elements.

Optionally, if the target function is a positioning function of the terminal, the adjusting the running parameters of the target function associated with the application program comprises at least one of:

if it is determined that a positioning type of the terminal does not belong to target network positioning, adjusting the positioning type of the terminal to the target network positioning; that is, the application program can detect a current positioning type of the terminal by using a positioning type detection program, and after entering the application power-saving mode, preferably use the target network positioning type, for example, by using a wireless fidelity (wifi) network or a mobile data network of the terminal for positioning, and if the detection determines that the terminal does not currently belong to the target network positioning type, the terminal needs to switch the positioning type, thereby achieving the effect of reducing the power consumption of the terminal;

adjusting a calling frequency of the positioning function in the terminal to be less than a positioning calling threshold; wherein the less the calling frequency of the positioning function in the terminal is, the less the consumption on the power of the terminal is; or adjusting a calling time of the positioning function in the terminal according to a running service type of the application program; that is, it can be determined whether it is necessary to call the positioning function of the terminal currently according to the running service type of the application program, for example, for a running service needing real-time positioning data transmission, such as a live broadcast service in the video interaction application, if the service is running, the continuous calling of the positioning function of the terminal is needed, and for example, for a running service not needing positioning data transmission, even if it is detected that the service is running, after entering the application power-saving mode, the positioning function of the terminal may not be called;

and/or, if the target function is the detection function depending on the sensing device, the adjusting the running parameters of the target function associated with the application program, comprises at least one of:

adjusting a calling frequency of the detection function depending on the sensing device in the terminal to be less than a sensing calling threshold; wherein the less the calling frequency of the detection function depending on the sensing device in the terminal is, the less the consumption on the power of the terminal is; or according to a running service type of the application program, adjusting a calling time of the detection function depending on the sensing device in the terminal, that is, according to the running service type of the application program, it can be determined whether it is necessary to call the detection function depending on the sensing device in the terminal currently and which sensing devices need to be called, for example, in a service scenario where the calling of an infrared detection sensor is needed, only the infrared detection sensor can be called, and other types of sensors are reduced or not called, so that the effect of reducing the power consumption of the terminal is achieved.

It should be noted that the above implementations of how to adjust the running parameters of the target function, as preferred examples in the embodiments of the present disclosure, should not construed as a specific limitation on the embodiments of the present disclosure, and according to the different target running functions, the running parameters corresponding to the target running function can be flexibly determined and adjusted. Moreover, various thresholds involved in the above examples can be flexibly set according to actual cases.

In the technical solutions of the embodiments of the present disclosure, by determining whether the application program currently running on the terminal needs to enter the application power-saving mode according to the application power-saving information preset by the user and the remaining power of the terminal, and adjusting the running parameters of the target function associated with the application program after determining to switch from the current running mode of the application program to the application power-saving mode, a reasonable solution for reducing the power consumption of the terminal is provided from the perspective of the application program, which expands the functions of the application program, realizes the diversification adjustment of the functions supported by the application program, achieves the effect of reducing the power consumption of the terminal by individually controlling the specific application program to enter the application power-saving mode, and solves the problem of lack of the reasonable solution for effectively reducing the power consumption of the terminal in the related art. Moreover, the embodiments of the present disclosure realizes the full consideration of the user requirements in the process of enabling the application power-saving mode of the application program, and ensures the use experience of the user for the application program while reducing the power consumption of the terminal.

Figure 5:
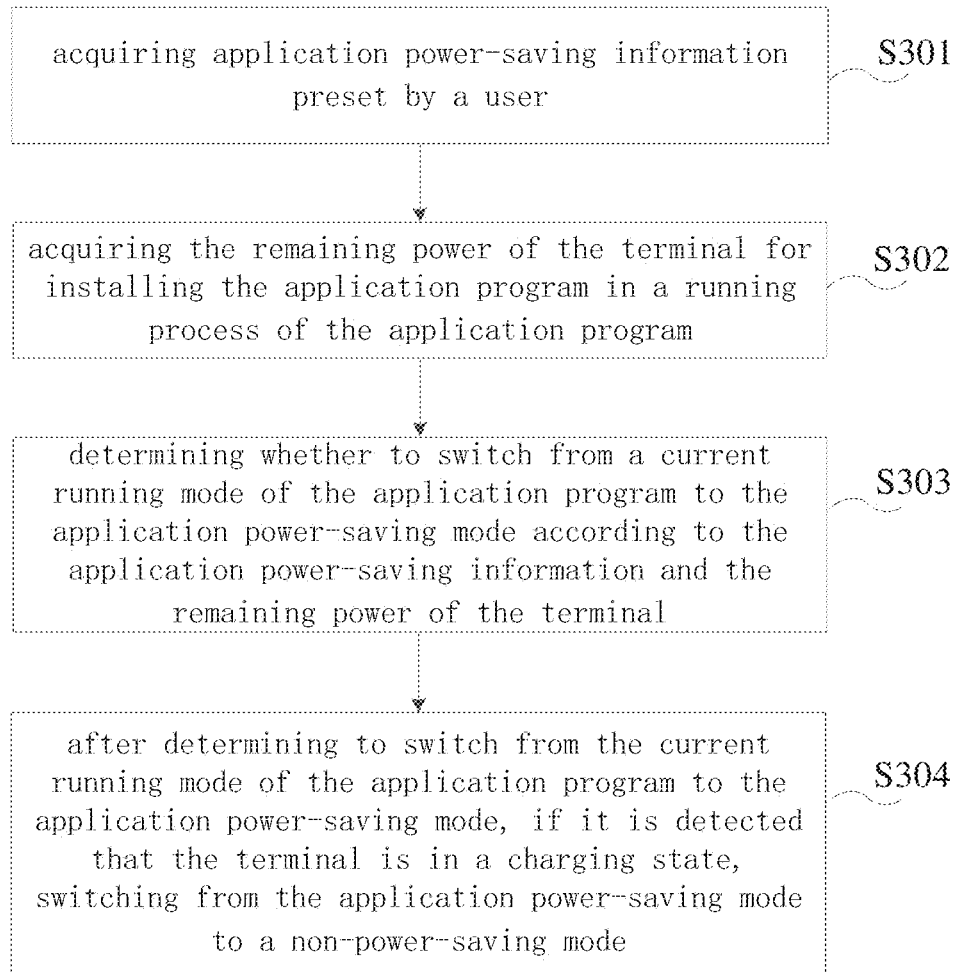
FIG. 5 is a flowchart of another switching method between running modes of an application program according to the embodiments of the present disclosure.

FIG. 5 is a flowchart of another switching method between running modes of an application program according to the embodiments of the present disclosure, which is further optimized and expanded based on the above technical solutions, and can be combined with each of the above optional embodiments.

As shown in FIG. 5, the switching method can comprise:
S301, acquiring application power-saving information preset by a user;
S302, detecting remaining power of a terminal for installing the application program in a running process of the application program;
S303, determining whether to switch from a current running mode of the application program to an application power-saving mode according to the application power-saving information and the remaining power of the terminal; and
S304, after determining to switch from the current running mode of the application program to the application power-saving mode, if it is detected that the terminal is in a charging state, switching from the application power-saving mode to a non-power-saving mode.

In the embodiments of the present disclosure, the application program can, after entering the power-saving mode, detect in real time whether the terminal enters a charging state, for example, if a change in electrical current on the terminal is detected, it can be determined that the terminal is in the charging state, or if an increase in the power on the terminal is detected, it can be determined that the terminal is in the charging state, so as to provide a better application use experience for the user, restore a function weakened or disabled by the application program, and switch from the current application power-saving mode to the non-power-saving mode.

Optionally, if it is detected that the terminal is in the charging state, the switching from the application power-saving mode to the non-power-saving mode comprises: if it is detected that the remaining power of the terminal in the charging state is greater than a mode exiting threshold, switching from the application power-saving mode to the non-power-saving mode. The mode exiting threshold can be determined as needed. When the application program detects that the remaining power of the terminal in the charging state is greater than the mode exiting threshold, this shows that the current remaining power of the terminal is relatively abundant, and can be better supplied to the running of the terminal.

Further, when the application program detects that the terminal just enters the charging state, it can also automatically switch from the application power-saving mode to the non-power-saving mode, so as to achieve the effect of timely restoring the running performance of the application program.

Optionally, after switching from the application power-saving mode to the non-power-saving mode, the switching method further comprises:
displaying exit prompt information on an application program running page in the non-power-saving mode; wherein the exit prompt information is used for prompting the user that the application program is in the non-power-saving mode, and a display position of the exit prompt information on the application program running page can be an upper, middle, or lower part of the page, which can be specifically determined according to the page layout.

Figure 6:
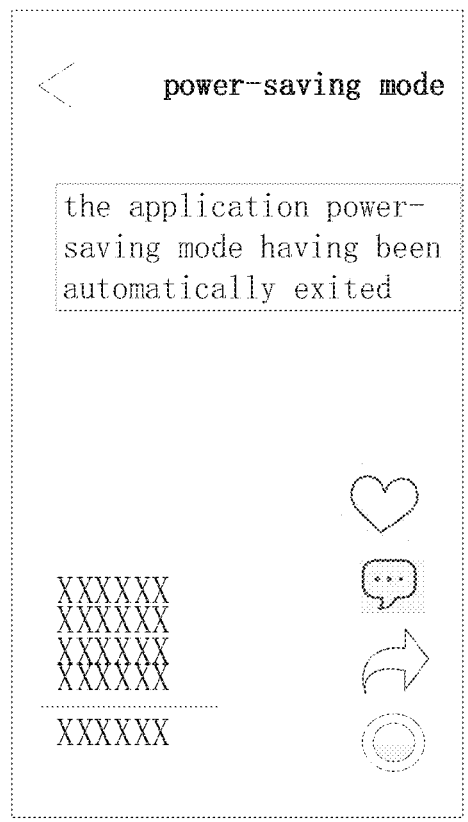
FIG. 6 is a schematic diagram of an application program running page having thereon displayed exit prompt information according to the embodiments of the present disclosure.

FIG. 6 is a schematic diagram of an application program running page having thereon displayed exit prompt information according to the embodiments of the present disclosure. As shown in FIG. 6, after the application program exits the application power-saving mode, it can display the exit prompt information in a form of a pop-up window on the application program running page in the non-power-saving mode, specifically the upper part of the page, wherein content of the exit prompt information can be, for example, a similar language expression such as "the application power-saving mode has been automatically exited". Further, after the display time of the exit prompt information reaches a preset display threshold, the application program can remove the exit prompt information from the current display page.

In the technical solutions of the embodiments of the present disclosure, by determining whether the application program currently running on the terminal needs to enter the application power-saving mode according to the application power-saving information preset by the user and the remaining power of the terminal, and after determining to switch from the current running mode of the application program to the application power-saving mode, switching from the application power-saving mode to the non-power-saving mode if it is detected that the terminal is in the charging state, a reasonable solution for reducing the power consumption of the terminal is provided from the perspective of the application program, which ensures the reasonability determination of the application program entering the application power-saving mode and exiting the application power-saving mode. Moreover, the embodiments of the present disclosure realize the full consideration of the user requirements in the process of enabling the application power-saving mode of the application program, and ensures the use experience of the user for the application program while reducing the power consumption of the terminal.

Figure 7:
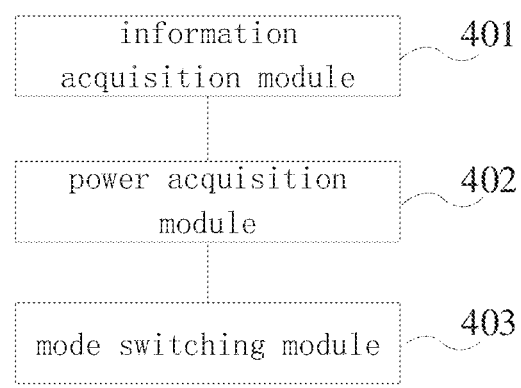
FIG. 7 is a schematic structural diagram of a switching apparatus between running modes of an application program according to the embodiments of the present disclosure.

FIG. 7 is a schematic structural diagram of a switching apparatus between running modes of an application program according to the embodiments of the present disclosure, wherein the apparatus can be implemented by software and/or hardware, and can be integrated on any electronic device with computing capability, for example, a terminal such as a mobile terminal, a personal computer, a tablet computer, etc. Further, the apparatus can be realized as the function of the application program and is integrated in the application program.

As shown in FIG. 7, the switching apparatus of the application program running mode according to the embodiments of the present disclosure can comprise an information acquisition module 401, an power acquisition module 402, and a mode switching module 403, wherein:

the information acquisition module 401 is configured to acquire application power-saving information preset by a user;

the power acquisition module 402 is configured to acquire remaining power of a terminal for installing the application program in a running process of the application program; and the mode switching module 403 is configured to determine whether to switch from the current running mode of the application program to the application power-saving mode according to the application power-saving information and the remaining power of the terminal.

Optionally, the apparatus according to the embodiments of the present disclosure further comprises:

a setting page display module, configured to display a setting page in the application program before the information acquisition module 401 performs an operation of acquiring the application power-saving information preset by the user; and an information determination module, configured to determine the application power-saving information preset by the user according to a setting operation of the user on the setting page; wherein the application power-saving information comprises a power-saving switching threshold, which refers to the terminal's remaining power corresponding to a triggering time of switching the application program to the application power-saving mode.

Optionally, the setting page display module comprises:

a power-saving prompt information display unit, configured to display power-saving prompt information on a current display page of the application program if it is detected that the remaining power of the terminal is less than a prompt threshold in the running process of the application program; and a page switching unit, configured to switch from the current display page to the setting page in the application program according to a touch operation of the user on the power-saving prompt information.

Optionally, the apparatus according to the embodiments of the present disclosure further comprises:

a running parameter adjustment module, configured to adjust running parameters of a target function associated with the application program after determining to switch from the current running mode of the application program to the application power-saving mode; wherein the target function comprises a native function of the application program and/or a native function of an operating system of the terminal.

Optionally, the running parameter adjustment module comprises:

an adjustment instruction sending unit, configured to send an adjustment instruction to the operating system of the terminal; wherein the adjustment instruction is used for instructing the operating system of the terminal to adjust the running parameters of the native function of the operating system of the terminal.

Optionally, the apparatus according to the embodiments of the present disclosure further comprises:

a charging detection module, configured to switch from the application power-saving mode to the non-power-saving mode if it is detected that the terminal is in the charging state.

Optionally, in the embodiments of the present disclosure, the application program includes a video editing application program;

accordingly, the native function of the application program includes at least one of a network data transmission function, a data cleaning function, a multimedia data editing function, a multimedia data playing function or a page rendering function; and the native function of the operating system of the terminal includes at least one of a positioning function or a detection function depending on a sensing device.

Optionally, the running parameter adjustment module is specifically configured to:

adjust the running parameters of the target function based on an adjustment priority of the target function associated with the application program.

Optionally, the running parameter adjustment module comprises:

a first adjustment unit, configured to adjust running parameters of a function belonging to a first adjustment grade in the target functions if the remaining power of the terminal is less than a first grade threshold, wherein the function belonging to the first adjustment grade comprises at least one of the multimedia data playing function, the positioning function, the page rendering function or the network data transmission function;

a second adjustment unit, configured to adjust running parameters of a function belonging to a second adjustment grade in the target functions if the remaining power of the terminal is less than a second grade threshold; wherein the function belonging to the second adjustment grade comprises at least one of the data cleaning function, the multimedia data editing function or the detection function depending on the sensing device; and the second grade threshold is less than the first grade threshold.

Optionally, if the target function is the network data transmission function, the running parameter adjustment module comprises at least one of:

an interaction frequency adjustment unit, configured to adjust a frequency of data interaction with a server to be less than an interaction threshold; or a bit rate adjustment unit, configured to adjust a bit rate of multimedia data acquired from the server to be less than a bit rate threshold;

and/or, if the target function is the data cleaning function, the running parameter adjustment module comprises:

a cleaning frequency adjustment unit, configured to adjust a frequency of application data cleaning to be less than a cleaning threshold;

and/or, if the target function is the multimedia data editing function, the running parameter adjustment module comprises:

an algorithm disabling unit, configured to disable the running of a target editing algorithm; wherein the target editing algorithm comprises at least one of a filter adding algorithm, a prop adding algorithm or a special-effect adding algorithm;

and/or, if the target function is the multimedia data playing function, the running parameter adjustment module comprises at least one of:

a brightness adjustment unit, configured to adjust playing brightness of the multimedia data to be less than a brightness threshold; or a volume adjustment unit, configured to adjust playing volume of the multimedia data to be less than a volume threshold;

and/or, if the target function is the page rendering function, the running parameter adjustment module comprises at least one of:

an element quantity adjustment unit, configured to adjust the quantity of animation elements in a page rendering process to be less than a quantity threshold; or an element switching unit, configured to switch the animation elements in the page rendering process into static elements.

Optionally, if the target function is the positioning function, the running parameter adjustment module comprises at least one of:

a positioning type adjustment unit, configured to adjust a positioning type of the terminal to target network positioning if it is determined that the positioning type of the terminal does not belong to the target network positioning;

a positioning calling frequency adjustment unit, configured to adjust a calling frequency of the positioning function in the terminal to be less than a positioning calling threshold; or a positioning calling time adjustment unit, configured to adjust a calling time of the positioning function in the terminal according to a running service type of the application program;

and/or, if the target function is the detection function depending on the sensing device, the running parameter adjustment module comprises at least one of:

a sensing calling frequency adjustment unit, configured to adjust a calling frequency of the detection function depending on the sensing device in the terminal to be less than a sensing calling threshold; or a sensing calling time adjustment unit, configured to adjust a calling time of the detection function depending on the sensing device in the terminal according to the running service type of the application program.

Optionally, the setting page display module further comprises:

a power-saving prompt information removing unit, configured to remove power-saving prompt information from the current display page if a touch operation of the user on the power-saving prompt information is not detected within a preset time after the power-saving prompt information display unit performs an operation of displaying the power-saving prompt information on the current display page of the application program.

Optionally, the charging detection module is specifically configured to:

if it is detected that the remaining power of the terminal in the charging state is greater than a mode exiting threshold, switch from the application power-saving mode to the non-power-saving mode.

Optionally, the apparatus according to the embodiments of the present disclosure further comprises:

an exit prompt information display module, configured to display exit prompt information on an application program running page in the non-power-saving mode after the charging detection module performs the operation of switching from the application power-saving mode to the non-power-saving mode if it is detected that the remaining power of the terminal in the charging state is greater than the mode exiting threshold, wherein the exit prompt information is used for prompting the user that the application program is in the non-power-saving mode.

The modules or units described above can be implemented as software components executed on one or more general-purpose processors, or as hardware that executes certain functions or a combination thereof, such as programmable logic devices and/or application-specific integrated circuits. In some embodiments, these modules or units can be embodied in a form of a software product, which can be stored in a non-volatile storage medium having therein included instructions that cause a computer device (e.g., a personal computer, a server, a network device, a mobile terminal, etc.) to implement the methods described in the embodiments of the present invention. In other embodiments, the above modules or units can further be implemented on a single device, or distributed on multiple devices. Functions of these modules or units can be combined with each other or further divided into a plurality of sub-units.

The switching apparatus between running modes of an application program according to the embodiments of the present disclosure can execute any switching method between running modes of an application program according to the embodiments of the present disclosure, and has function modules and beneficial effects corresponding to the execution of the method. Reference can be made to the description in any method embodiment of the present disclosure for contents not described in detail in the apparatus embodiments of the present disclosure.

Figure 8:
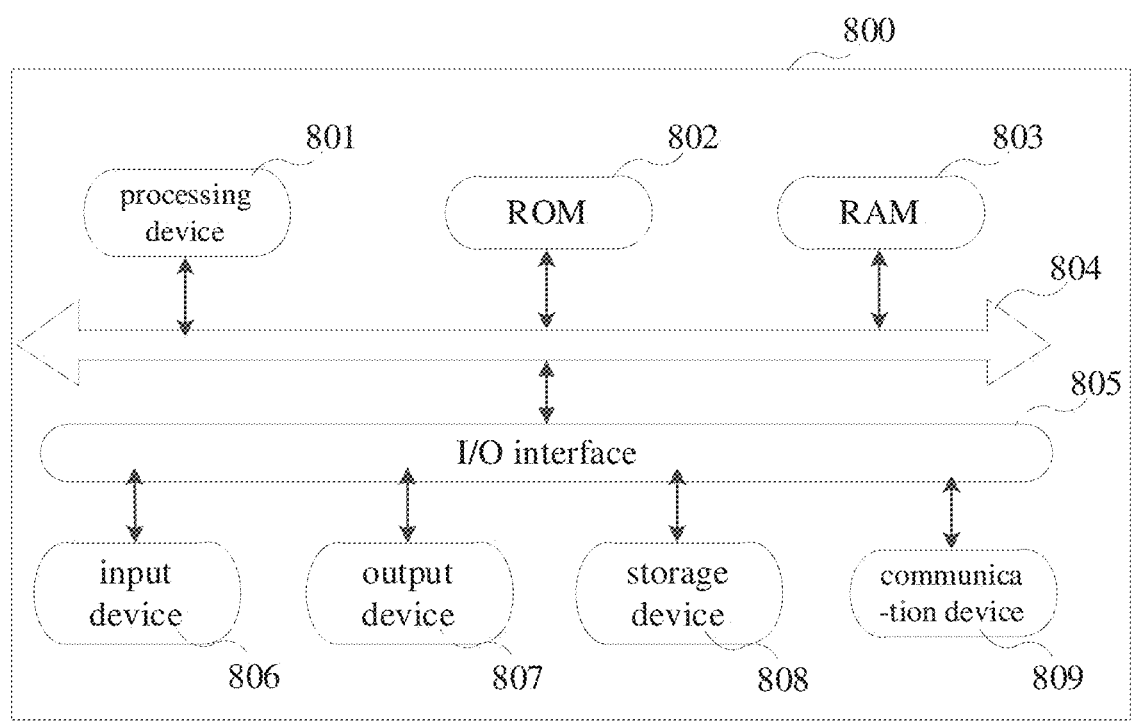
FIG. 8 is a schematic structural diagram of an electronic device according to the embodiments of the present disclosure.

FIG. 8 is a schematic structural diagram of an electronic device according to the embodiments of the present disclosure, which is used for exemplarily explaining the terminal for executing the application program running mode switching method in the examples of the present disclosure. The electronic device in the embodiments of the present disclosure can include, but is not limited to, a mobile terminal such as a mobile phone, notebook computer, digital broadcast receiver, PDA (Personal Digital Assistant), PAD (tablet computer), PMP (portable multimedia player), in-vehicle terminal (e.g., in-vehicle navigation terminal), etc., and a fixed terminal such as a digital TV, desktop computer, etc. The electronic device shown in FIG. 8 is only an example, and should not bring any limitation to the functions and the use scope of the embodiments of the present disclosure.

As shown in FIG. 8, an electronic device 800 can comprise a processing device (or referred to as a processor, e.g., a central processing unit, a graphic processing unit, etc.) 801, which can perform various appropriate actions and processes according to a program stored in a read-only memory (ROM) 802 or a program loaded from a storage device 808 into a random access memory (RAM) 803. In the RAM 803, various programs and data required for operations by the electronic apparatus 800 are also stored. The processing device 801, the ROM 802, and the RAM 803 are connected to each other via a bus 804. An input/output (I/O) interface 805 is also connected to the bus 804.

Generally, the following devices can be connected to the I/O interface 805: an input device 806 including, for example, a touch screen, touch pad, keyboard, mouse, camera, microphone, accelerometer, gyroscope, etc.; an output device 807 including, for example, a liquid crystal display (LCD), speaker, vibrator, etc.; a storage device 808 including, for example, a magnetic tape, hard disk, etc.; and a communication device 809. The communication device 809 can allow the electronic device 800 to perform wireless or wire communication with other devices to exchange data. While FIG. 8 illustrates the electronic device 800 having various devices, it should be understood that not all illustrated devices are required to be implemented or provided. More or fewer devices can be alternatively implemented or provided.

In particular, according to the embodiments of the present disclosure, the processes described above with reference to the flow diagram can be implemented as a computer software program. For example, the embodiments of the present disclosure include a computer program product, which comprises a computer program carried on a non-transitory computer-readable medium, the computer program containing program code for performing the method illustrated by the flowchart. In such an embodiment, the computer program can be downloaded and installed from a network via the communication device 809, or installed from the storage device 808, or installed from the ROM 802. When the computer program is executed by the processing apparatus 801, the above functions defined in the methods of the embodiments of the present disclosure are performed.

It should be noted that the above computer-readable medium of the present disclosure can be a computer-readable signal medium or a computer-readable storage medium or any combination of the two. The computer-readable storage medium can be, for example, but is not limited to, an electronic, magnetic, optical, electromagnetic, infrared, or semiconductor system, apparatus, or device, or any combination of the above. More specific examples of the computer-readable storage medium can include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium having therein contained or stored a program that can be used by or in combination with an instruction execution system, apparatus, or device. However, in the present disclosure, the computer-readable signal medium can comprise a data signal propagated in baseband or as part of a carrier wave, in which the computer-readable program code is carried. Such a propagated data signal can take a variety of forms, including, but not limited to, an electro-magnetic signal, an optical signal, or any suitable combination of the above. The computer-readable signal medium can be any computer-readable medium except the computer-readable storage medium, which can send, propagate, or transmit a program for use by or in combination with an instruction execution system, apparatus, or device. The program code contained on the computer-readable medium can be transmitted by using any appropriate medium, including but not limited to: an electrical wire, optical cable, RF (radio frequency), etc., or any suitable combination of the above.

In some embodiments, a client and a server can communicate by using any currently known or future developed network protocol, such as HTTP (HyperText Transfer Protocol), and can be interconnected with digital data communication (e.g., a communication network) in any form or medium. Examples of the communication network include a local area network (LAN), a wide area network (WAN), an internet (e.g., the Internet), and a peer-to-peer network (e.g., ad hoc peer-to-peer network), as well as any currently known or future developed network.

The above computer-readable medium can be embodied in the electronic device; or can be individual and not assembled into the electronic device.

The above computer-readable medium has therein carried one or more programs which, when executed by the electronic device, cause the electronic device to: acquire the application power-saving information preset by the user; detect the remaining power of the terminal for installing the application program in the running process of the application program; and determine whether to switch from the current running mode of the application program to the application power-saving mode according to the application power-saving information and the remaining power of the terminal.

The computer program code for performing the operations of the present disclosure can be written in one or more programming languages or any combination thereof, including but not limited to an object-oriented programming language such as Java, Smalltalk, C++, as well as a conventional procedural programming language, such as a "C" programming language or a similar programming language. The program code can be executed entirely on a user's computer, partially on the user's computer, as a stand-alone software package, partially on the user's computer and partially on a remote computer, or entirely on the remote computer or server. In the case of the remote computer involved, through any type of network: including a local area network (LAN) or a wide area network (WAN), the remote computer can be connected to the user's computer, or can be connected to an external computer (for example, through the Internet using an Internet service provider).

The flowchart and block diagrams in the drawings illustrate the architecture, functions, and operations of possible implementations of the systems, methods and computer program products according to various embodiments of the present disclosure. In this regard, each block in the flowchart or block diagram can represent a module, program segment, or portion of code, which comprises one or more executable instructions for implementing the specified logic function. It should also be noted that, in some alternative implementations, functions noted in blocks can occur in a different order noted in the drawings. For example, two blocks expressed in succession can actually be executed substantially in parallel, or they can sometimes be executed in a reverse order, depending upon functions involved. It will also be noted that each block of the block diagram and/or flowchart, and a combination of blocks in the block diagram and/or flowchart, can be implemented by a dedicated hardware-based system performing specified functions or operations, or a combination of dedicated hardware and computer instructions.

The involved modules or units described in the embodiments of the present disclosure can be implemented by software or hardware. Therein, the name of the module or unit does not constitute a limitation on the module or the unit itself in some cases, for example, the information acquisition module can also be described as a "module for acquiring application power-saving information preset by a user".

The functions described above herein can be performed, at least in part, by one or more hardware logic components. For example, without limitation, an exemplary hardware logic component that can be used includes: a field programmable gate array (FPGA), application specific integrated circuit (ASIC), application specific standard product (ASSP), system on a chip (SOC), complex programmable logic device (CPLD), etc.

In the context of this disclosure, a machine-readable medium can be a tangible medium that can have therein contained or stored a program for use by or in combination with an instruction execution system, apparatus, or device. The machine-readable medium can be a machine-readable signal medium or a machine-readable storage medium. The machine-readable medium can include, but is not limited to an electronic, magnetic, optical, electromagnetic, infrared, or semiconductor system, apparatus, or device, or any suitable combination of the above. More specific examples of the machine-readable storage medium can include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

It should be noted that, herein, relation terms such as "first", "second", etc., are used solely for distinguishing one entity or operation from another entity or operation without necessarily requiring or implying the presence of any such actual relation or order between these entities or operations. Moreover, terms "comprise", "include", or any other variation thereof, are intended to cover a non-exclusive inclusion, such that a process, method, article, or device comprising a list of elements comprises not only those elements, but also other elements not expressly listed or inherent in such a process, method, article, or device. Without further limitations, an element defined by the statement "comprising a . . . " does not preclude the presence of other identical elements in the process, method, article, or device comprising the element.

The above are merely specific embodiments of the present disclosure, which will enable those skilled in the art to understand or implement the present disclosure. Various modifications to these embodiments will be readily apparent to those skilled in the art, and the general principles defined herein can be implemented in other embodiments without departing from the spirit or scope of the present disclosure. Thus, the present disclosure will not be limited to the embodiments herein, but will conform to the widest scope consistent with the principles and novel features disclosed herein.

What is claimed is:

1. A switching method for switching between running modes of an application program, comprising:
    acquiring application power-saving information preset by a user, wherein the application power-saving information comprises a power-saving switching threshold and time when the application program enters an application power-saving mode, and the power-saving switching threshold refers to remaining power of a terminal corresponding to a triggering time of switching the application program to the application power-saving mode;
    acquiring remaining power of the terminal installing the application program in a running process of the application program;
    determining whether to switch from a current running mode of the application program to the application power-saving mode if the application power-saving information and the remaining power of the terminal meet an application program running mode switching condition, under which a current remaining power of the terminal is less than the power-saving switching threshold, and current time reaches the time preset by the user for the application program to enter the application power-saving mode; and
    after determining to switch from the current running mode of the application program to the application power-saving mode, adjusting running parameters of a target function associated with the application program, wherein the target function comprises a native function of the application program, and the native function of the application program comprises at least one of a network data transmission function, a data cleaning function, a multimedia data editing function, a multimedia data playing function, or a page rendering function.

2. The switching method according to claim 1, further comprising, before the acquiring application power-saving information preset by a user:
    displaying a setting page in the application program; and
    determining the application power-saving information preset by the user according to a setting operation of the user on the setting page.

3. The switching method according to claim 2, wherein the displaying a setting page in the application program comprises:
    in the running process of the application program, if the remaining power of the terminal is less than a prompt threshold, displaying power-saving prompt information on a current display page of the application program; and
    according to a touch operation of the user on the power-saving prompt information, switching from the current display page to the setting page in the application program.

4. The switching method according to claim 3, wherein the displaying a setting page in the application program further comprises:
    if a touch operation of the user on the power-saving prompt information is not detected within a preset time, removing the power-saving prompt information from the current display page.

5. The switching method according to claim 1, wherein the target function further comprises a native function of an operating system of the terminal.

6. The switching method according to claim 5, wherein the adjusting running parameters of a target function associated with the application program comprises:
    sending an adjustment instruction to the operating system of the terminal, wherein the adjustment instruction is used for instructing the operating system of the terminal to adjust running parameters of the native function of the operating system of the terminal.

7. The switching method according to claim 1, further comprising:
    after determining to switch from the current running mode of the application program to the application power-saving mode, if it is detected that the terminal is in a charging state, switching from the application power-saving mode to a non-power-saving mode.

8. The switching method according to claim 1, wherein if the application power-saving information preset by the user and the remaining power of the terminal do not meet the application program running mode switching condition, the application program determining not to execute the switching between modes.

9. The switching method according to claim 5, wherein:
    the application program comprises a video editing application program; and the native function of the operating system of the terminal includes at least one of a positioning function or a detection function depending on a sensing device.

10. The switching method according to claim 9, wherein the adjusting running parameters of a target function associated with the application program comprises:
adjusting the running parameters of the target function according to an adjustment priority of the target function associated with the application program.

11. The switching method according to claim 10, wherein the target function comprises different target functions, and the adjusting the running parameters of the target function according to an adjustment priority of the target function associated with the application program comprises:
analyzing use frequencies of the user for the different target functions by collecting operation data in a process of using the application program by the user; and
determining adjustment priorities of the different target functions according to the use frequencies of the user for the different target functions, wherein the lower the use frequency is, the higher the adjustment priority is.

12. The switching method according to claim 10, wherein the adjusting the running parameters of the target function according to an adjustment priority of the target function associated with the application program comprises:
if the remaining power of the terminal is less than a first grade threshold, adjusting running parameters of a function belonging to a first adjustment grade in the target functions, wherein the function belonging to the first adjustment grade comprises at least one of multimedia data playing function, positioning function, page rendering function or network data transmission function; and
if the remaining power of the terminal is less than a second grade threshold, adjusting running parameters of a function belonging to a second adjustment grade in the target functions, wherein the function belonging to the second adjustment grade comprises at least one of data cleaning function, multimedia data editing function or detection function depending on the sensing device, and the second grade threshold is less than the first grade threshold.

13. The switching method according to claim 9, wherein:
if the target function is the network data transmission function, the adjusting the running parameters of the target function associated with the application program comprises at least one of:
adjusting a frequency of data interaction with a server to be less than an interaction threshold; or
adjusting a bit rate of multimedia data acquired from the server to be less than a bit rate threshold; and/or,
if the target function is the data cleaning function, the adjusting the running parameters of the target function associated with the application program comprises:
adjusting a frequency of application data cleaning to be less than a cleaning threshold; and/or,
if the target function is the multimedia data editing function, the adjusting the running parameters of the target function associated with the application program comprises
disabling running a target editing algorithm, wherein the target editing algorithm comprises at least one of a filter adding algorithm, a prop adding algorithm or a special-effect adding algorithm; and/or,
if the target function is the multimedia data playing function, the adjusting the running parameters of the target function associated with the application program comprises at least one of:
adjusting playing brightness of the multimedia data to be less than a brightness threshold; or
adjusting playing volume of the multimedia data to be less than a volume threshold; and/or,
if the target function is the page rendering function, the adjusting the running parameters of the target function associated with the application program comprises at least one of:
adjusting the quantity of animation elements in a page rendering process to be less than a quantity threshold; or
switching the animation elements in the page rendering process into static elements.

14. The switching method according to claim 9, wherein:
if the target function is the positioning function, the adjusting the running parameters of the target function associated with the application program comprises at least one of:
if it is determined that a positioning type of the terminal does not belong to target network positioning, adjusting the positioning type of the terminal to the target network positioning;
adjusting a calling frequency of the positioning function in the terminal to be less than a positioning calling threshold; or
adjusting a calling time of the positioning function in the terminal according to a running service type of the application program; and/or,
if the target function is the detection function depending on the sensing device, the adjusting the running parameters of the target function associated with the application program comprises at least one of:
adjusting a calling frequency of the detection function depending on the sensing device in the terminal to be less than a sensing calling threshold; or
according to a running service type of the application program, adjusting a calling time of the detection function depending on the sensing device in the terminal.

15. An apparatus for switching between running modes of an application program, comprising:
an information acquisition module, configured to acquire application power-saving information preset by a user, wherein the application power-saving information comprises a power-saving switching threshold and time when the application program enters an application power-saving mode, and the power-saving switching threshold refers to remaining power of a terminal corresponding to a triggering time of switching the application program to the application power-saving mode;
a power acquisition module, configured to acquire remaining power of the terminal for installing the application program in a running process of the application program;
a mode switching module, configured to determine whether to switch from a current running mode of the application program to the application power-saving mode if the application power-saving information and the remaining power of the terminal meet an application program running mode switching condition, under which a current remaining power of the terminal is less than the power-saving switching threshold, and current time reaches the time preset by the user for the application program to enter the application power-saving mode; and an adjusting module, configured to, after determining to switch from the current running mode of the application program to the application power-saving mode, adjust running parameters of a target function associated with the application program, wherein the target function comprises a native function of the application program, and the native function of the application program comprises at least one of a network data transmission function, a data cleaning function, a multimedia data editing function, a multimedia data playing function, or a page rendering function.

16. An electronic device, comprising:

a processor; and a memory configured to store executable instructions of the processor;

wherein the processor is configured to read the executable instructions from the memory and execute the executable instructions to implement the switching method between running modes of the application program according to claim 1.

17. The electronic device according to claim 16, further comprising:

a detection device, configured to detect remaining power of a terminal for installing the application program in a running process of the application program.

18. A non-transitory computer-readable storage medium having therein stored a computer program which, when executed by a processor, implements the switching method between running modes of the application program according to claim 1.

19. A non-transitory computer program product, comprising instructions which, when executed by a processor, cause the processor to perform the switching method between running modes of the application program according to claim 1.

* * * * *